(12) United States Patent
Bonev

(10) Patent No.: US 12,352,605 B2
(45) Date of Patent: Jul. 8, 2025

(54) BAROMETER ADAPTIVE SAMPLING BY TIGHT INTEGRATION WITH OTHER SENSORS AND ACTUATORS

(71) Applicant: Google LLC, Mountain View, CA (US)

(72) Inventor: Boyan Bonev, Santa Clarita, CA (US)

(73) Assignee: Google LLC, Mountain View, CA (US)

( * ) Notice: Subject to any disclaimer, the term of this patent is extended or adjusted under 35 U.S.C. 154(b) by 152 days.

(21) Appl. No.: 18/031,185

(22) PCT Filed: Oct. 20, 2020

(86) PCT No.: PCT/US2020/056466
§ 371 (c)(1),
(2) Date: Apr. 11, 2023

(87) PCT Pub. No.: WO2022/086500
PCT Pub. Date: Apr. 28, 2022

(65) Prior Publication Data
US 2023/0400331 A1 Dec. 14, 2023

(51) Int. Cl.
G01D 3/08 (2006.01)
G01C 5/06 (2006.01)
G01D 3/036 (2006.01)

(52) U.S. Cl.
CPC .............. *G01D 3/08* (2013.01); *G01C 5/06* (2013.01); *G01D 3/0365* (2013.01)

(58) Field of Classification Search
CPC ........... G01D 3/08; G01D 3/0365; G01C 5/06
See application file for complete search history.

(56) References Cited

U.S. PATENT DOCUMENTS

| | | | |
|---|---|---|---|
| 6,970,795 B1 * | 11/2005 | Burgett | G01S 19/42 702/85 |
| 10,178,510 B1 * | 1/2019 | Kai | G01S 5/0289 |
| 10,367,932 B1 * | 7/2019 | Zhu | G01C 5/06 |
| 10,386,268 B2 * | 8/2019 | Panis | G01L 23/08 |
| 10,432,194 B2 * | 10/2019 | Bar | G01D 5/24 |

(Continued)

FOREIGN PATENT DOCUMENTS

| | | |
|---|---|---|
| CN | 105277171 A | 1/2016 |
| CN | 107636438 A | 1/2018 |

(Continued)

OTHER PUBLICATIONS

Wei Lu, et al., Smart Triggering of the Barometer in a Fall Detector Using a Semi-Permeable Membrane, IEEE Transactions on Biomedical Engineering, Apr. 2019, 13 pages.

(Continued)

*Primary Examiner* — Chico A Foxx
(74) *Attorney, Agent, or Firm* — Lerner David LLP

(57) ABSTRACT

A personal electronic device is provided with a feature of intelligently adjusting a sampling rate of sensors, such as barometers. Before acquiring a measurement from the sensor, the device checks other hardware for conditions that could introduce noise into the measurement. If the device does not determine that excessive noise is likely after checking the other hardware, the device proceeds to acquire the measurement from the sensor. Otherwise, the device delays the measurement. At the end of the delay, the device may check the other hardware again before acquiring the measurement from the sensor.

18 Claims, 6 Drawing Sheets

(56) References Cited

U.S. PATENT DOCUMENTS

| | | | |
|---|---|---|---|
| 10,638,217 B2 | 4/2020 | Hou et al. | |
| 11,282,514 B2* | 3/2022 | Sun | G10L 15/20 |
| 2004/0145467 A1* | 7/2004 | Roby | G09B 21/009 |
| | | | 340/531 |
| 2004/0190928 A1* | 9/2004 | Tsunoda | G03G 15/50 |
| | | | 399/91 |
| 2004/0228215 A1* | 11/2004 | Ichikawa | G01S 3/802 |
| | | | 367/124 |
| 2005/0096848 A1* | 5/2005 | Hou | E21B 21/085 |
| | | | 702/9 |
| 2013/0097704 A1* | 4/2013 | Gavrilut | G06N 3/02 |
| | | | 726/23 |
| 2014/0108252 A1* | 4/2014 | Itwaru | G06Q 20/3276 |
| | | | 705/44 |
| 2014/0214353 A1 | 7/2014 | Barfield et al. | |
| 2015/0094095 A1* | 4/2015 | Johnson | H04W 4/023 |
| | | | 455/456.3 |
| 2015/0168438 A1* | 6/2015 | Tsubata | G01C 5/06 |
| | | | 702/144 |
| 2015/0293580 A1* | 10/2015 | Munoz | G06F 1/3206 |
| | | | 713/323 |
| 2015/0297133 A1* | 10/2015 | Jouanique-Dubuis | |
| | | | A61B 5/0205 |
| | | | 600/484 |
| 2015/0335288 A1 | 11/2015 | Toth et al. | |
| 2016/0007101 A1* | 1/2016 | Straeussnigg | G08C 15/02 |
| | | | 340/870.19 |
| 2016/0247091 A1* | 8/2016 | McCaffrey | G06F 40/40 |
| 2016/0267908 A1* | 9/2016 | Borjeson | G10L 25/84 |
| 2017/0071017 A1* | 3/2017 | Klemans | H04W 4/80 |
| 2019/0130925 A1* | 5/2019 | Parikh | H03G 3/32 |
| 2019/0227114 A1* | 7/2019 | Aschauer | G01R 31/2829 |
| 2019/0253802 A1* | 8/2019 | Wang | G10L 21/0208 |
| 2020/0107113 A1* | 4/2020 | Hou | G01L 15/00 |
| 2020/0282999 A1* | 9/2020 | Mizrachi | B60W 40/076 |
| 2022/0201383 A1* | 6/2022 | Hua | H04R 1/1083 |
| 2022/0317309 A1* | 10/2022 | Gamble, Jr. | G01C 5/00 |

FOREIGN PATENT DOCUMENTS

| | | | | |
|---|---|---|---|---|
| CN | 105277171 B | * | 1/2019 | |
| CN | 110505833 A | | 11/2019 | |
| CN | 117310808 A | * | 12/2023 | |
| EP | 3092460 B1 | | 4/2019 | |
| JP | 2010240158 A | * | 10/2010 | |
| KR | 101945776 B1 | * | 2/2019 | |
| NZ | 539363 A | * | 4/2006 | G08B 1/08 |
| WO | WO-2018082051 A1 | * | 5/2018 | G01C 5/06 |
| WO | 2018182911 A1 | | 10/2018 | |

OTHER PUBLICATIONS

Zheng L, Wu D, Ruan X, et al. A Novel Energy-Efficient Approach for Human Activity Recognition. Sensors (Basel). 2017;17(9):2064. Published Sep. 8, 2017., 21 pages.

International Search Report and Written Opinion for International Application No. PCT/US2020/056466 dated Jun. 21, 2021. 15 pages.

International Preliminary Report on Patentability for International Application No. PCT/US2020/056466 dated May 4, 2023. 10 pages.

Office Action for Chinese Patent Application No. 202080106394.2 dated Sep. 26, 2024. 11 pages.

\* cited by examiner

BAROMETER ADAPTIVE SAMPLING BY TIGHT INTEGRATION WITH OTHER SENSORS AND ACTUATORS

CROSS-REFERENCE TO RELATED APPLICATIONS

This application is a national phase entry under 35 U.S.C. § 371 of International Application No. PCT/US2020/056466, filed Oct. 20, 2020, the disclosure of which is hereby incorporated herein by reference.

BACKGROUND

A variety of personal electronics, such as smart watches, activity trackers, or other wearable electronic devices, include barometers. A device can use its barometer to detect changes in elevation. However, other features of the device, such as a speaker or haptic actuators, can introduce noise to measurements taken by the barometer. Such interference is particularly significant in designs that place the barometers near the speaker. Common use of the device, such as by moving the device quickly or speaking into it, can also introduce noise into the measurements taken by the barometer.

Barometers consume more power than some other device inputs, so barometer sensor sampling rates tend to be relatively low to preserve battery life. Real time usage of barometer measurements, such as for tracking the user's position or gestures, therefore relies on relatively few data points, meaning noise affecting any one sample will have an outsized effect on any barometer dependent function. Avoiding transient conditions that introduce noise when acquiring samples from the barometer would improve the results of barometer dependent functions.

BRIEF SUMMARY

A device may be configured to acquire measurements from a barometer at a variable rate. The rate may vary based on measurements acquired from or instructions sent to hardware features of the device other than the barometer. The configuration of the device may include a timer function for observing a sampling interval. At the end of the sampling interval, the device may check hardware features other than the barometer for conditions that could introduce noise to a measurement by the barometer. If the noise associated conditions are within acceptable limits, a measurement may be acquired from the barometer. If the noise associated conditions are outside of acceptable limits, the device may avoid acquiring a measurement from the barometer and instead wait for a delay interval of shorter duration than the sampling interval before checking the hardware other than the barometer again. Acceptable limits for the noise associated conditions may become less strict as time since the end of the sampling interval passes. The timer function may reset at the end of the sampling interval, meaning that sampling intervals will end with a fixed frequency that does not vary, regardless of how long the device waits because of noise associated conditions.

A buffer window may begin at the end of the sampling interval. At the end of the buffer window, the device may acquire a measurement from the barometer regardless of noise associated conditions. Thus, at the end of the buffer window, the device may acquire a measurement from the barometer without checking hardware other than the barometer for noise associated conditions.

In another aspect, a device may be configured to increase the sampling rate for the barometer while noise associated conditions exist. The device may be configured to reduce the sampling interval whenever an instruction of at least a threshold magnitude is sent to noise generating hardware or a measurement of at least a threshold magnitude is received from a noise indicative sensor. In another example, the device may be configured to check hardware other than the barometer for noise associated conditions upon acquiring a measurement from the barometer. If noise associated conditions beyond a threshold magnitude are detected, the sampling rate may be increased. The sampling rate may remain increased until noise associated conditions below a threshold magnitude are detected upon a check of the hardware other than the barometer.

In another aspect, a device may comprise a sensor, noise associated hardware, and one or more processors in communication with the sensor and the noise associated hardware. The one or more processors may be configured to periodically check the noise associated hardware for noise associated conditions. The one or more processors may also be configured to determine to either acquire a measurement from the sensor if the noise associated conditions are within acceptable limits or delay acquisition of a measurement from the sensor if the noise associated conditions are outside of acceptable limits.

In some arrangements, the processor may be configured to, upon determining to delay acquisition of a measurement, wait through a delay interval, after the end of the delay interval, check the noise associated hardware again for second noise associated conditions, and determine to either acquire a second measurement from the sensor if the second noise associated conditions are within acceptable limits or delay acquisition of the second measurement from the sensor if the second noise associated conditions are outside of acceptable limits.

In some arrangements, the processor may be configured to acquire a third measurement from the sensor, regardless of noise associated conditions, after a predetermined number of delays.

In some arrangements, the sensor may be a first sensor, and the noise associated hardware may include a second sensor sampled more frequently than the first sensor.

In some arrangements, the noise associated conditions may include either output by the noise associated hardware or a measurement acquired from another sensor.

In some arrangements, acceptable limits for the noise associated conditions may be a predefined threshold magnitude for the output by the noise associated hardware or the measurement acquired from the other sensor.

In some arrangements, the sensor may be a barometer.

In some arrangements, the processor may be configured to, upon acquisition of a measurement from the sensor, use the noise associated conditions most recently observed to interpret the measurement.

In some arrangements, the checking of the noise associated hardware for noise associated conditions for which the processor is configured may include checking for output by the noise associated hardware, the output creating a condition that could introduce noise to a measurement acquired from the sensor.

In some arrangements, the device of claim 9, the noise associated hardware may include at least one of a speaker or an actuator.

In some arrangements, the sensor may be a barometer, and the noise associated hardware includes at least one of a speaker, microphone, actuator, accelerometer, or inertial measurement unit.

In some arrangements, the one or more processors may be configured to use a measurement acquired from the barometer to estimate an elevation of the personal electronic device.

In another aspect, a method of periodically sampling a sensor may comprise checking, with one or more processors, hardware other than the sensor for noise associated conditions. The method may further comprise determining, with the one or more processors, to either acquire a measurement from a sensor if the noise associated conditions are within acceptable limits or delay acquisition of a measurement from the sensor if the noise associated conditions are outside of acceptable limits.

In some arrangements, the method may comprise, upon making the determination to delay acquisition of a measurement, waiting through a delay interval, and, after the end of the delay interval, repeating the steps of checking the hardware and making the determination to either acquire or delay acquisition of a measurement.

In some arrangements, the method may comprise adjusting the acceptable limits to become more permissive relative to an initial state each time acquisition of a measurement is delayed, and resetting the acceptable limits to the initial state upon acquiring a measurement.

In some arrangements, the steps of checking hardware and making a determination may be executed at the end of a repeating sampling interval of longer duration than the delay interval.

In some arrangements, the method may comprise, upon expiration of a predetermined buffer interval following an end of a given sampling interval, acquiring a measurement from the sensor regardless of the noise conditions if a measurement has not been acquired from the sensor since the end of the given sampling interval.

In some arrangements, checking the noise associated hardware for noise associated conditions may include checking for instructions sent to output hardware that would, when executed by the output hardware, cause the output hardware to create a condition that could introduce noise to a measurement acquired from the sensor.

In another aspect, a non-transitory computer-readable medium may store instructions, which when executed by one or more processors, may cause the processors to periodically check noise associated hardware for noise associated conditions. The instructions may further cause the processors to make a determination to either acquire a measurement from a sensor if the noise associated conditions are within acceptable limits or delay acquisition of the measurement from the sensor if the noise associated conditions are outside of acceptable limits.

In some arrangements, the medium may store instructions, which when executed by one or more processors, may cause the processors to, upon making the determination to delay acquisition of a measurement, wait through a delay interval. The instructions may further cause the processors to, after the end of the delay interval, repeat the steps of checking the hardware and making the determination to either acquire or delay acquisition of the measurement.

DETAILED DESCRIPTION

Figure 1:
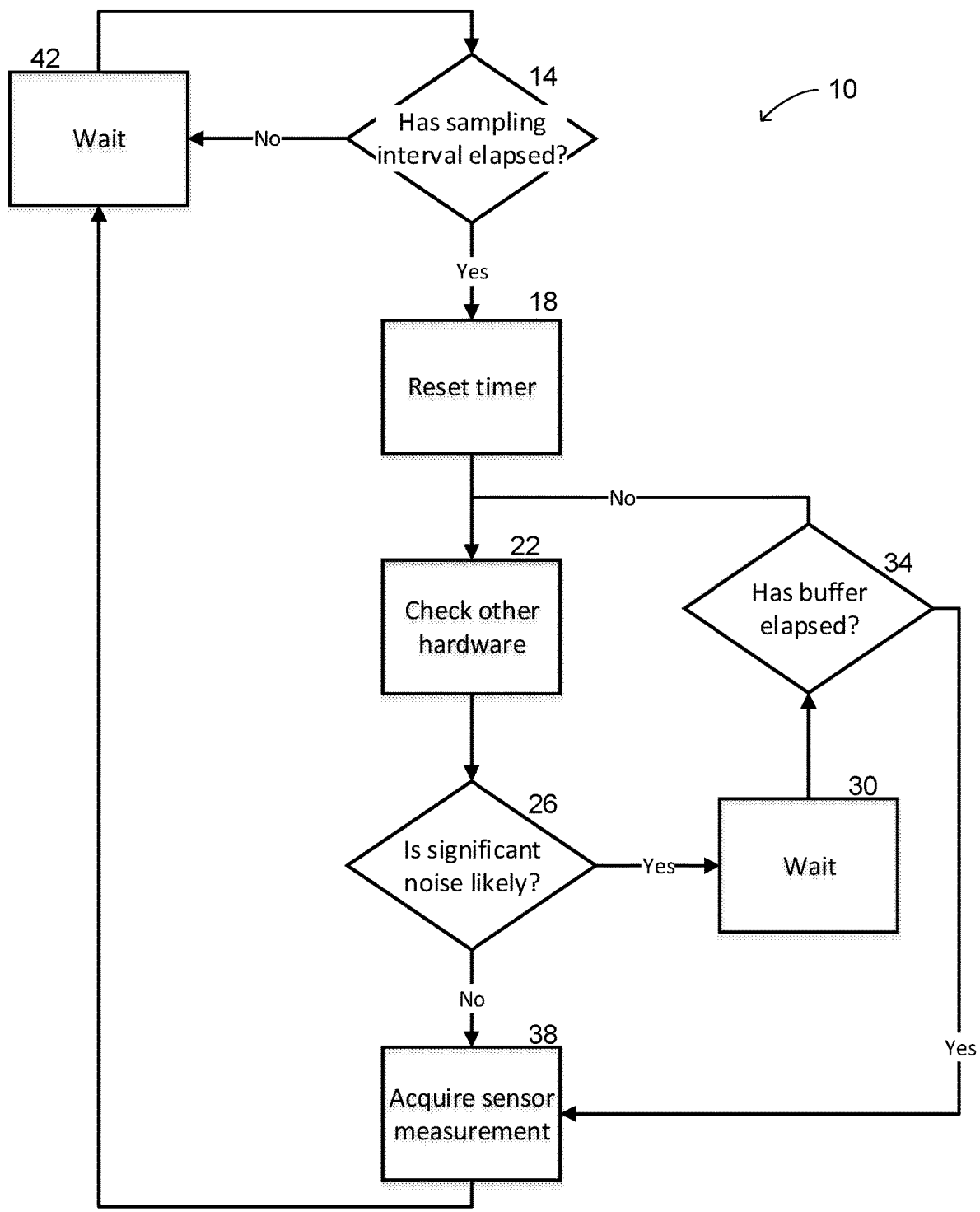
FIG. 1 is a block diagram of an example process according to an aspect of the disclosure.

A process 10 for periodically acquiring measurements from a barometer is illustrated in FIG. 1. The process 10 may be performed, for example, by any electronic device having a barometer, a processor, memory, and other hardware that may create or detect conditions that could create noise in measurements acquired from the barometer. Though the process 10 is described with regard to a barometer, the same or similar steps may be executed in acquiring measurements from any other type of sensor. In such examples, where hardware or conditions associated with barometric noise are mentioned below, the same considerations may instead be made with regard to hardware or conditions associated with noise detectable by any other sensor.

The process 10 repeats on a sampling interval for the barometer. When the sampling interval elapses at block 14, the device resets the timer at block 18. The device then proceeds to check hardware other than the barometer for barometer noise associated conditions at block 22.

Here, "noise associated conditions" refers to any conditions that, at a sufficient magnitude, could introduce noise to a measurement acquired from a given sensor. Thus, noise associated hardware is any hardware capable of producing or detecting noise associated conditions. With regard to the barometer, noise associated conditions include sounds and movements that create a variance in the air pressure near the barometer, so noise associated hardware includes any hardware that could produce or detect motion or sound. The noise associated hardware available to check will therefore vary depending on the device. The process 10 can include checking all available noise associated hardware, or any subset of possible noise associated hardware that is efficient to check in a given application. For example, in devices with several types of noise associated sensors, it may be efficient to limit the check to sensors that are already run at a higher sampling rate than the barometer.

In examples of a smart watch or phone executing the process 10, checking other hardware at block 22 for noise associated conditions includes any one or combination of checking instructions sent to a haptic actuator, instructions sent to a speaker, a measurement acquired from an accelerometer, a measurement acquired from a microphone, a measurement acquired from an inertial measurement unit, or a measurement from a magnetometer unit. In examples implemented in robotics or other motorized devices, checking other hardware at block 22 includes checking, in addition or in the alternative to any or all of the foregoing examples of noise associated hardware, either or both of instructions to a motor and feedback from a servo motor.

The device then determines at block 26 whether the noise associated conditions observed from the check at block 22 are likely to introduce significant noise to a measurement acquired from the barometer. The determination at block 26 of whether significant noise is likely is made by comparing the noise associated conditions observed at block 22 to a predetermined threshold. In some examples, a different predetermined threshold is assigned to each noise associated condition. If any noise associated condition exceeds its respective threshold, significant noise is considered likely. In other examples, any two or more noise associated conditions, up to all noise associated conditions, are individually weighted and considered in sum against a cumulative predetermined threshold. In such latter examples, significant noise is considered likely if the total value of the weighted noise associated conditions in a group exceeds the cumulative predetermined threshold for the group.

As an example of the foregoing where noise associated hardware in a system includes a speaker and an accelerometer, executing block 22 may include checking whether the speaker is instructed to create sound and checking whether the accelerometer detects movement of the system. A predetermined volume threshold may exist for the speaker. If the speaker is instructed to produce sound in excess of the threshold volume, it may be determined at block 26 that significant noise is likely. Different predetermined volume thresholds may be defined for different pitches. Similarly, a predetermined acceleration threshold may exist for the accelerometer. If acceleration beyond the acceleration threshold is detected by the accelerometer, it may be determined at block 26 that significant noise is likely. In addition or alternative to the foregoing, speaker volume and acceleration may both be assigned a weight, and if a sum of the weighted speaker volume and acceleration exceeds a predetermined total threshold, it may be determined at block 26 that significant noise is likely. The foregoing principles can be applied to any set of noise associated hardware that a system may possess.

If significant noise is determined to be likely at block 26, the device will not immediately acquire a measurement from the barometer. In the illustrated example, the device 10 instead waits at block 30, then determines at block 34 whether a buffer interval following the reset of the timer at block 18 has elapsed. If the buffer interval has not elapsed upon the check at block 34, the device will return to block 22 to check noise associated hardware again. If significant noise is not determined to be likely at block 26, or if the buffer interval has elapsed when checked at block 34, the device will proceed to acquiring a measurement from the barometer at block 38. Following acquisition of the measurement at block 38, the device will wait at block 42 until the end of the sampling interval at block 14, at which point the series of events beginning at block 18 will be repeated.

According to the above described process 10, the device will delay a periodic acquisition of a measurement from a sensor if other available hardware indicates that significant noise is likely. The delay will continue until either a predetermined amount of time passes following the scheduled acquisition, at which time the device will acquire a measurement regardless of noise associated conditions, or until a check of the noise associated hardware does not indicate that significant noise is likely. Whenever the measurement is acquired, the noise associated conditions observed during the most recent pass through block 22 can be used to interpret or refine the measurement, such as by estimating how noise affected the acquired measurement.

The placement of the buffer checking block 34 shown in FIG. 1 is by way of example only. In processes according to other examples, the device delays and recheck noise associated hardware indefinitely, thus eliminating block 34. In further examples, the device achieves the same effect as the process 10 as illustrated in FIG. 1, but with different logic. In some such examples, the device proceeds to acquiring a measurement from the barometer regardless of noise associated conditions after determining that a predetermined number of delays have occurred since the previous acquisition. In other such examples, block 34 is located elsewhere between blocks 18 and 38, while a determination that the buffer interval has elapsed nonetheless leads directly to block 38.

The buffer interval may be less than the sampling interval. The buffer interval is a predetermined fraction or percentage of the sampling interval. By way of example only, the sampling interval may be one quarter of a second, correlating to a sampling rate of 4 Hz, meaning the system would request a measurement from the sensor four times per second. If the buffer interval is 10% of the sampling interval, the buffer interval is 0.025 seconds. In such examples, because the sampling interval remains constant regardless of delays, the minimum time between any two requests from the system to the sensor to acquire a measurement is 0.225 seconds, and the maximum time between any two requests from the system to the sensor to acquire a measurements is 0.275 seconds. Actual time between measurements may vary further, as some sensors require time to take a measurement after receiving a request.

In some examples, the delay time at block 30 is similarly a predetermined fraction or percentage of the sampling interval and buffer interval. For example, if the delay time is 1% of the sampling interval, it is 10% of the buffer interval. If, further, the sampling rate is 4 Hz, the delay time is 0.0025 seconds. In such an example, the measurement can be delayed ten times after the end of a sampling interval before the buffer interval will elapse, at which time the measurement will be acquired regardless of noise associated conditions. In other examples, the delay time at block 30 varies, such as becoming shorter as the number of delays since the end of the sampling interval increases.

The process 10 may be implemented with different values for any of the foregoing quantities. By way of example only, sampling rates may range from approximately 0.5 to 10 Hz, inclusive, but the process 10 may be implemented with any sampling rate. Buffer intervals may range from approximately 5% to 25% or 50% of the sampling interval. Delay times may range from approximately 0.1% to 2.5% or 5.0% of the sampling interval. It should be understood that these values are illustrative as opposed to limiting.

The duration of the wait at block 30 may vary depending on the noise associated conditions found at block 22. The variance may be in proportion to the magnitude of the noise found in the determination at block 26. In other examples, where the noise associated conditions are detected among instructions sent to output hardware, the duration of the delay may be informed by the content of the instructions. For example, if the instructions directed to noise associated output hardware, such as a speaker or actuator, suggest that the output hardware will produce a noise associated condition for a period of time, the wait at block 30 could continue until a time at which the instructions suggest the output will dip or cease.

Figure 2:
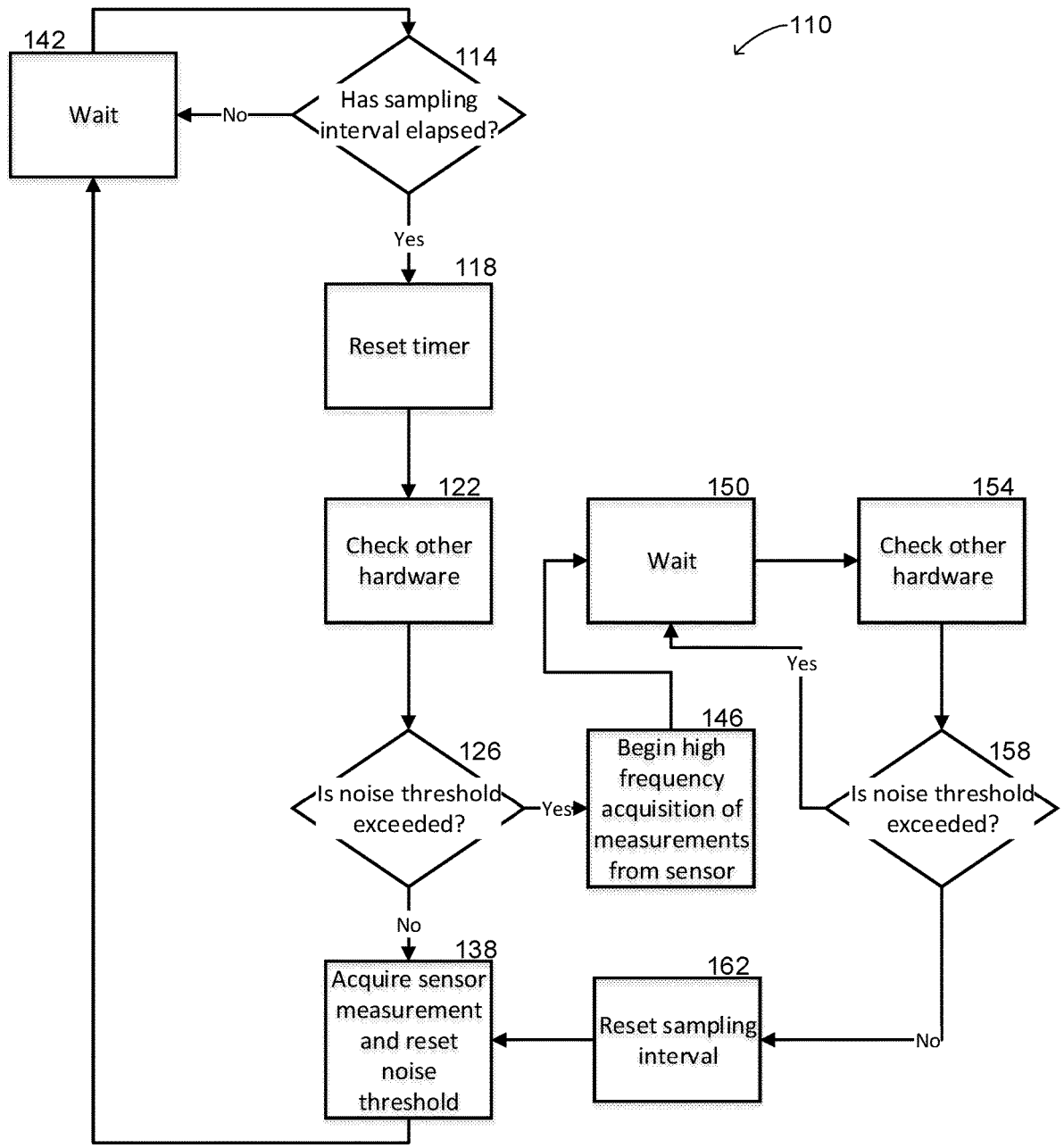
FIG. 2 is a block diagram of an example process according to another aspect of the disclosure.

FIG. 2 shows a process 110 according to another aspect of the disclosure. Between the processes 10, 110 as illustrated in FIGS. 1 and 2, like reference numbers refer to like elements, such as blocks 122 and 126 being executable in the same ways as described above with regard to blocks 22 and 26, unless specifically noted otherwise. As such, not all elements of the process 110 will be specifically described.

In the process 110, if significant noise is found likely at block 126, the device will enter a state of high frequency acquisition of measurements from the barometer at block 146. High frequency acquisition may be any elevated sampling rate that exceeds the sampling rate corresponding to the normal sampling interval. Elevated sampling rates from 1.2 to 20 times the normal sampling rate, with specific examples being 1.2, 1.5, 2, 3, 4, 5, and 10 times the normal sampling rate, are contemplated. The device then waits at block 150 before checking the noise associated hardware again at block 154. The wait at block 150 may last through the duration of one or more high frequency sampling intervals. As such, in various examples, the wait at block 150 lasts either for the time between one high frequency sample and the next, or across multiple high frequency samples, such as 2, 3, 4, or 5 high frequency samples. In other examples, the wait at block 150 lasts through a duration that is a function of the frequency at which noise associated hardware can be checked. In some such example, the wait duration is a single or multiple of a sampling interval of a noise associated sensor.

At block 158, the noise associated conditions observed at block 154 are evaluated for their likely contribution of noise to measurements from the barometer in generally the same way as at block 126. If significant noise is again found likely, high frequency sampling continues and the process waits again at block 150. If significant noise is not found likely at block 158, the process instead moves onto block 162, where the sampling interval is reset to its previous, relatively low frequency.

Figure 3:
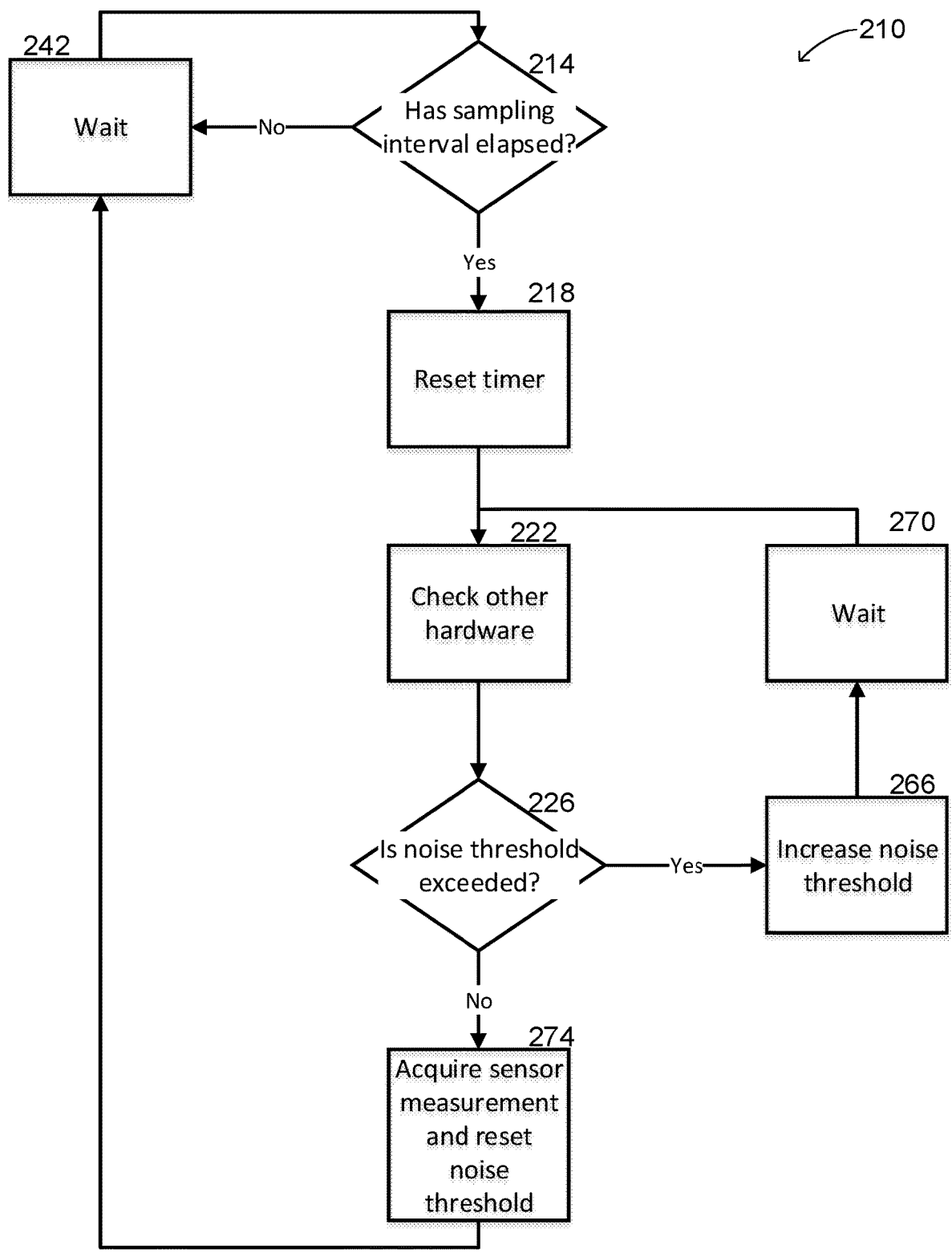
FIG. 3 is a block diagram of an example process according to another aspect of the disclosure.

FIG. 3 shows a process 210 according to another aspect of the disclosure. Again, between the processes 10, 110, 210, the like elements refer to like, such as blocks 222 and 226 being executable in the same ways as described above with regard to blocks 22 and 26, unless specifically noted otherwise. As such, not all elements of the process 210 will be specifically described.

In the process 210, if significant noise is found likely at block 226, the noise threshold that was exceeded is increased at block 266. In various examples where multiple thresholds are considered, either all thresholds are increased, or only those thresholds that were exceeded are increased. After increasing the noise threshold at block 266, the device waits at block 270 before returning to blocks 222 and 226 to recheck and reevaluate the noise associated conditions against the new threshold, respectively. When a pass through block 226 does not find noise associated conditions exceeding any noise threshold or thresholds in effect, the device proceeds to acquire a sensor measurement and reset the noise threshold or thresholds to an initial state at block 274. Thus, the process 210 becomes more permissive with regard to noise associated conditions each time the acquisition of a measurement is delayed, and resets when a measurement is acquired.

Though illustrated and described separately, according to various examples the above described processes 10, 110, 210 may be combined. In some examples, the process 210 of FIG. 3 is implemented with a buffer interval similar to the buffer interval described with regard to the process 10 of FIG. 1. Thus, the process 210 could delay acquisition of a measurement and increase the noise threshold or thresholds only a predetermined number of times before acquiring a measurement and resetting the noise threshold or thresholds.

Figure 4:
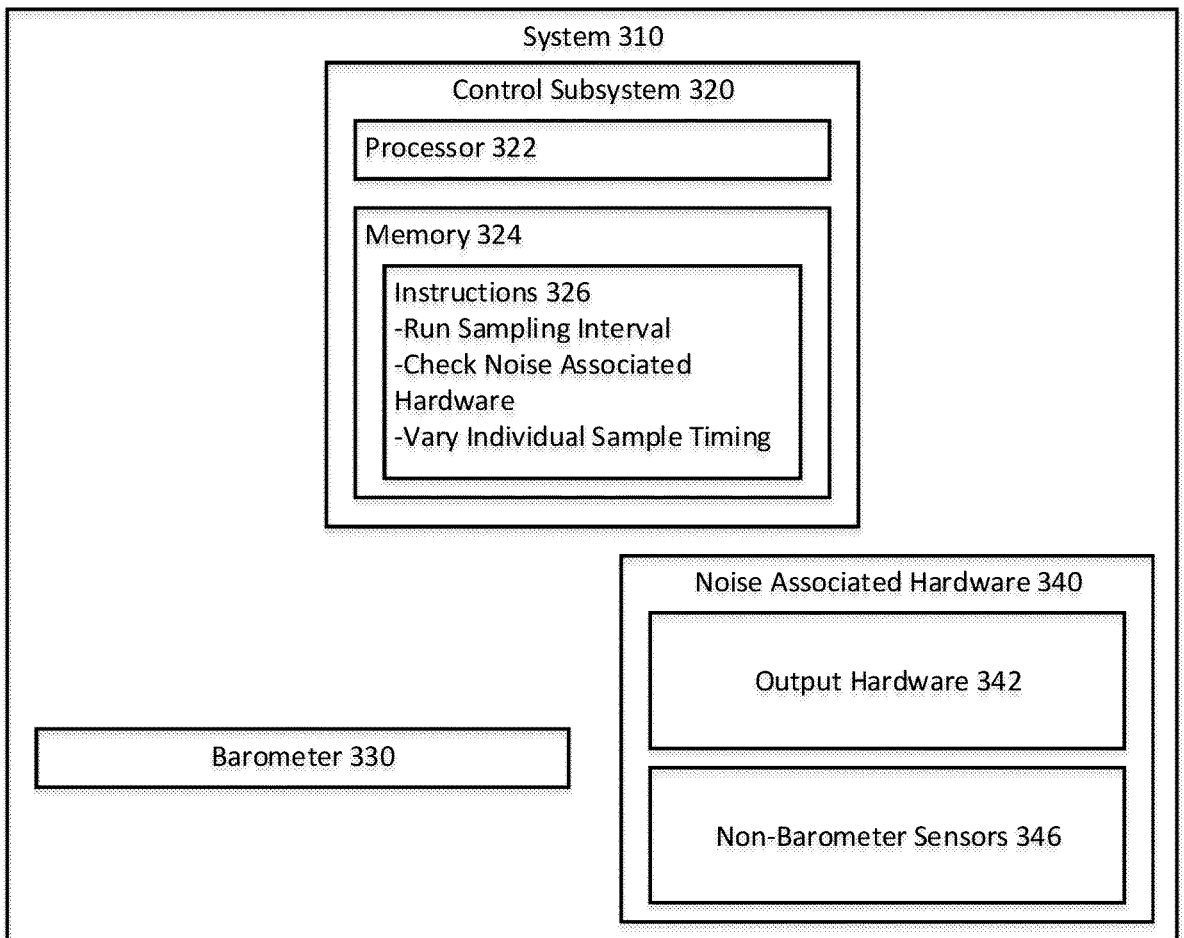
FIG. 4 is a block diagram of an example system according to aspects of the disclosure.

Any of the processes 10, 110, 210 described above may be executed by a system 310 as shown in FIG. 4. The system 310 could be within any device that includes a processor, memory, a barometer, and other hardware that may produce or detect conditions that would introduce noise to a measurement from the barometer. Such devices include personal electronic devices such as smart phones, smart watches, wearable activity trackers, and certain computers. Robots, vehicles, and manufacturing equipment for some applications can also implement the process 10. Further, a barometer is used here as one example of a sensor that could be sampled on a variable interval. As the processes 10, 110, 210 could be implemented to sample sensors other than barometers on variable intervals, other arrangements of the system 310 could include a corresponding sensor other than a barometer along with hardware capable of producing or detecting conditions associated with noise in that sensor.

The system 310 of the illustrated example includes a control subsystem 320, which in turn includes one or more processors 322 and memory 324. However, in other examples, the above processes 10, 110, 210 may be employed by systems lacking discrete subsystems, processors, or memory.

The processor 322 may be a single processor, or multiple cooperating processors. The one or more processors 322 may be any conventional processors, such as commercially available microprocessors. Alternatively, the one or more processors may be a dedicated device such as an application specific integrated circuit (ASIC) or other hardware-based processor. Although FIG. 3 functionally illustrates the processor, memory, and other elements of the control subsystem 320 as being within the same block, it will be understood by those of ordinary skill in the art that the processor or memory may actually include multiple processors or memories that may or may not be stored within the same physical housing. Similarly, the memory may be a hard drive or other storage media located in a housing different from that of the control subsystem 320. Accordingly, references to a processor or computing device will be understood to include references to a collection of processors or computing devices or memories that may or may not operate in parallel.

Memory 324 may store information that is accessible by the processors 322, including instructions 326 that may be executed by the processors 322, and data. The memory 324 may be of a type of memory operative to store information accessible by the processors 322, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 326 and data are stored on different types of media.

Data may be retrieved, stored or modified by processors 322 in accordance with the instructions 326. For instance, although the present disclosure is not limited by a particular data structure, the data may be stored in computer registers, in a relational database as a table having a plurality of different fields and records, XML documents, or flat files. The data may also be formatted in a computer-readable format such as, but not limited to, binary values, ASCII or Unicode. By further way of example only, the data may be stored as bitmaps comprised of pixels that are stored in compressed or uncompressed, or various image formats (e.g., JPEG), vector-based formats (e.g., SVG) or computer instructions for drawing graphics. Moreover, the data may comprise information sufficient to identify the relevant information, such as numbers, descriptive text, proprietary codes, pointers, references to data stored in other memories (including other network locations) or information that is used by a function to calculate the relevant data.

The instructions 326 may be executed to carry out any of the above described processes 10, 110, 210, such as by running a timer on a fixed sampling interval, checking noise associated hardware for noise associated conditions, and varying the timing of individual noise samples based on the likelihood of significant noise.

The control subsystem 320 is in electronic communication, which may be wired or wireless, with a barometer 330 and noise associated hardware 340. Though the control subsystem 320, barometer 330, and noise associated hardware 340 are shown within the same block, they may in separate physical housings or the same housing.

The noise associated hardware 340 may include any hardware that could detect or produce conditions that could introduce noise into measurements acquired from the barometer 330. For examples, as shown, the noise associated hardware includes output hardware 342 and noise associated sensors 346. The output hardware 342 may be any hardware that the device uses to act or communicate, such as vibration mechanisms or actuators for producing haptic feedback, speakers, etc. The noise associated sensors 346 may include, for example, any sensors other than the barometer 330 that could detect conditions associated with noise in barometer measurements such as microphones, accelerometers, gyroscopes, inertial measurement units, other barometers, etc. While in the example shown the noise associated hardware includes both output hardware 342 and noise associated sensors 346, it should be understood that in other examples either or neither may be included.

The electronic communication enables the control subsystem 320, including the processor 322, to observe any instructions 344 sent to the output devices 342 and measurements acquired from the noise associated sensors 346. The processor 322 evaluates the instructions 344 and measurements, individually or in combination, and if the processor 322 determines that significant noise would likely exist in a measurement of the barometer 330 at the end of a sampling interval, the processor 322 varies the time of the measurement according to any of the above described processes 10, 110, 210.

Figure 5:
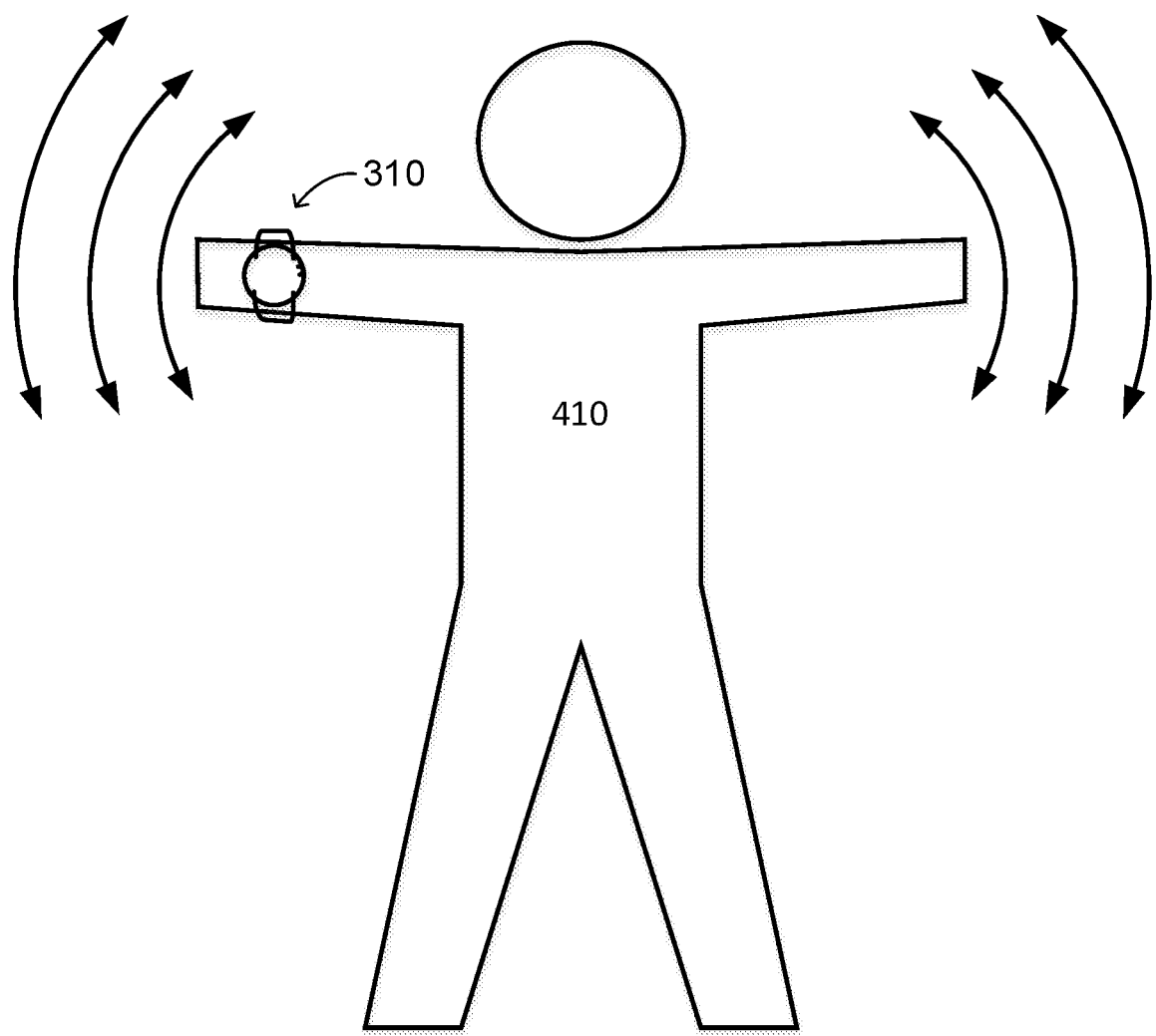
FIG. 5 is a pictorial diagram of the system of FIG. 4 in use by a user.

In FIG. 5, the system 310 is incorporated into a smart watch or wrist-worn activity tracker. A user 410 wearing the system 310 on the user's 410 wrist is engaged in arm movement, such as exercise or hand gestures. The system 310 executes any of the above described processes 10, 110, 210 by varying the timing of individual samples from the barometer 330 in view of measurements from any one or any combination of an accelerometer, a gyroscope, and an inertial measurement unit in the system 310. The system 310 is therefore able to discern the elevation of the user's 410 wrist with relative accuracy by excluding air pressure fluctuations caused by the wearer's sudden movements or by the system's 310 own haptic output. The system 310 may be able to use the improved elevation measurements to classify and count the user's 410 actions, such as hand waving or repetitions of an exercise.

Figure 6:
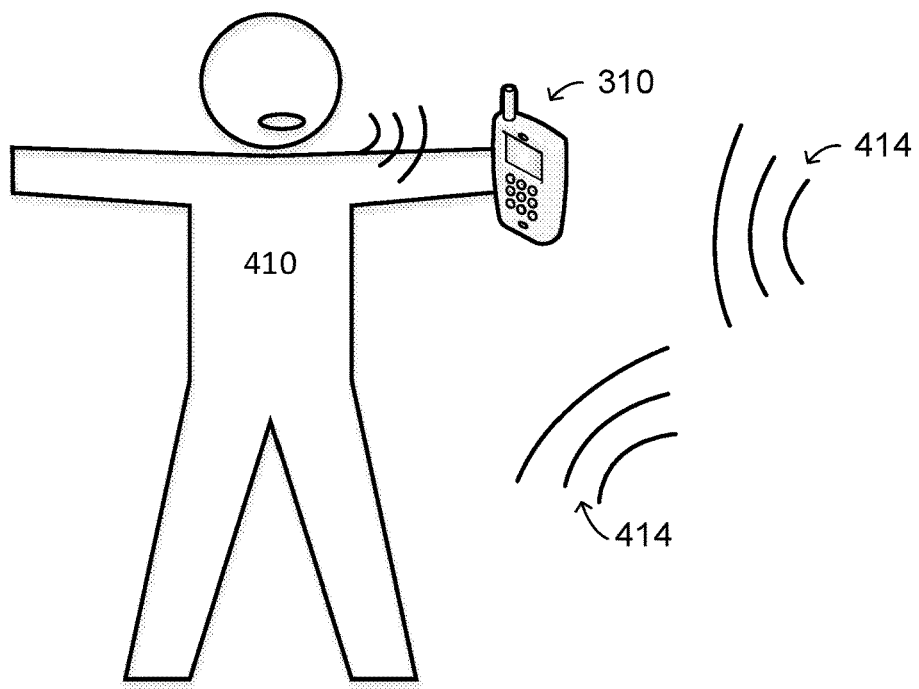
FIG. 6 is another pictorial diagram of the system of FIG. 4 in use by a user.

FIG. 6 illustrates another application, in which the system 310 is implemented in a cellular device. The system 310 executes any of the processes 10, 110, 210 by receiving input from the microphone as the user 410 speaks, or as ambient sounds 414 reach the device. For the user's privacy, the system 310 may be configured to receive input from the microphone without recording sound for the purposes of the processes 10, 110, 210, or to only receive input from the microphone in limited circumstances. By receiving input from the microphone and applying any of the processes 10, 110, 210, the system 310 can reduce the effect of the user's speech, ambient sound, or sound emitted from the system's 310 own speakers on barometer measurements.

Figure 7:
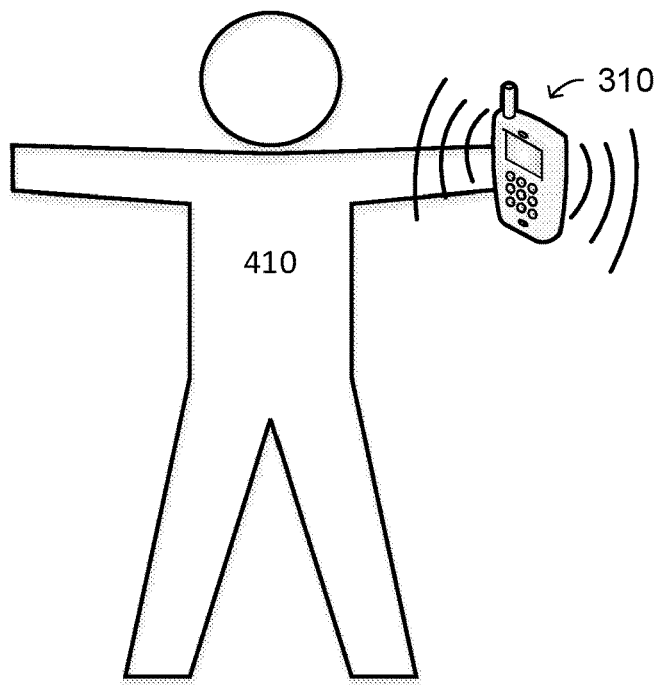
FIG. 7 is another pictorial diagram of the system of FIG. 4 in use by a user.

FIG. 7 illustrates another application of the system 310 in a cellular device. The system 310 identifies conditions created by the device's noise associated hardware, such as the cellular device's speaker and haptic actuator, as the cellular device produces sound and haptic feedback. By executing any of the processes 10, 110, 210, the system can reduce the effect of the cellular device's vibration or sound from the speaker on barometer measurements, such as by delaying individual barometer samples to avoid acquiring a measurement from the barometer while the actuator causes the device to vibrate or the speaker emits a loud sound. Reducing the effect of the conditions that introduce noise into measurements acquired from the barometer enables the device to make air pressure or elevation determinations with an effective overall accuracy comparable to that achieved by sampling the barometer at a relatively fast, constant rate. The device therefore achieves the accuracy of a high constant sampling rate without the associated power consumption.

Though the examples of FIGS. 5-7 are described as applied in smart watches and cellular devices, the same features can be applied to any wearable personal electronic device, such as earbuds, pendants, and smartglasses. As such, though the system 310 is illustrated as implemented in a smart watch or wrist-worn activity tracker in FIG. 5, the same functions could be performed with the system 310 applied in a cellular device. Similarly, though the system 310 is illustrated as implemented in a cellular device in FIGS. 6 and 7, the same functions could be performed with the system applied in a smart watch.

Although the subject matter herein has been described with reference to particular examples, it is to be understood that these examples are merely illustrative of the principles and applications of the present disclosure. It is therefore to be understood that numerous modifications may be made to the illustrative examples and that other arrangements may be devised without departing from the spirit and scope of the present subject as defined by the appended claims.

The invention claimed is:

1. A device comprising:
    a barometer sensor;
    barometric noise associated hardware capable of detecting movement of the device or sound; and
    one or more processors in communication with the barometer sensor and the barometric noise associated hardware, the one or more processors configured to:
    periodically check the barometric noise associated hardware for barometric noise associated conditions based on instructions sent to the barometric noise associated hardware that, when executed by the barometric noise associated hardware, cause the barometric noise associated hardware to create a condition introducing barometric noise to a measurement acquired from the barometer sensor; and
    determine to either acquire the measurement from the barometer sensor if the barometric noise associated conditions are within acceptable limits or delay acquisition of the measurement from the barometer sensor if the barometric noise associated conditions are outside of acceptable limits.

2. The device of claim 1, wherein the processor is configured to:
    upon determining to delay acquisition of a measurement, wait through a delay interval;

after the end of the delay interval, check the barometric noise associated hardware again for second barometric noise associated conditions; and determine to either acquire a second measurement from the barometer sensor if the second barometric noise associated conditions are within acceptable limits or delay acquisition of the second measurement from the barometer sensor if the second barometric noise associated conditions are outside of acceptable limits.

3. The device of claim 2, wherein the processor is configured to acquire a third measurement from the barometer sensor, regardless of barometric noise associated conditions, after a predetermined number of delays.

4. The device of claim 1, wherein the barometer sensor is a first sensor, and the barometric noise associated hardware includes a second sensor sampled more frequently than the first sensor.

5. The device of claim 1, wherein the barometric noise associated conditions include either output by the barometric noise associated hardware or a measurement acquired from another sensor.

6. The device of claim 5, wherein acceptable limits for the barometric noise associated conditions are a predefined threshold magnitude for the output by the barometric noise associated hardware or the measurement acquired from the other sensor.

7. The device of claim 1, wherein the processor is configured to, upon acquisition of a measurement from the sensor, use the barometric noise associated conditions most recently observed to interpret the measurement.

8. The device of claim 1, wherein the checking of the barometric noise associated hardware for barometric noise associated conditions for which the processor is configured includes checking for output by the barometric noise associated hardware, the output creating a condition that could introduce barometric noise to a measurement acquired from the barometer sensor.

9. The device of claim 8, wherein the barometric noise associated hardware includes at least one of a speaker or an actuator.

10. The device of claim 1, wherein the barometric noise associated hardware includes at least one of a speaker, microphone, actuator, accelerometer, or inertial measurement unit.

11. The device of claim 10, wherein the one or more processors are configured to use a measurement acquired from the barometer sensor to estimate an elevation of the personal electronic device.

12. A method of periodically sampling a barometer sensor, comprising:

checking, with one or more processors, barometric noise associated hardware capable of detecting movement of a device or sound for barometric noise associated conditions based on instructions sent to output hardware that, when executed by the output hardware, cause the output hardware to create a condition introducing barometric noise to a measurement acquired from the barometer sensor; and determining, with the one or more processors, to either acquire the measurement from the barometer sensor if the barometric noise associated conditions are within acceptable limits or delay acquisition of the measurement from the barometer sensor if the barometric noise associated conditions are outside of acceptable limits.

13. The method of claim 12, comprising:

upon making the determination to delay acquisition of the measurement, waiting through a delay interval; and after the end of the delay interval, repeating the steps of checking the barometric noise associated hardware and making the determination to either acquire or delay the acquisition of the measurement.

14. The method of claim 13, comprising adjusting the acceptable limits to become more permissive relative to an initial state each time acquisition of a measurement is delayed, and resetting the acceptable limits to the initial state upon acquiring a measurement.

15. The method of claim 13, wherein the steps of checking the barometric noise associated hardware and making a determination are executed at the end of a repeating sampling interval of longer duration than the delay interval.

16. The method of claim 15, comprising, upon expiration of a predetermined buffer interval following an end of a given sampling interval, acquiring a measurement from the barometer sensor regardless of the barometric noise conditions if a measurement has not been acquired from the barometer sensor since the end of the given sampling interval.

17. A non-transitory computer-readable medium storing instructions, which when executed by one or more processors, would cause the processors to:

periodically check barometric noise associated hardware for barometric noise associated conditions based on instructions sent to output hardware that, when executed by the output hardware, cause the output hardware to create a condition introducing barometric noise to a measurement acquired from a barometer sensor, wherein the barometric noise associated hardware is capable of detecting movement of a device or sound; and make a determination to either acquire the measurement from the barometer sensor if the noise associated conditions are within acceptable limits or delay acquisition of the measurement from the barometer sensor if the barometric noise associated conditions are outside of acceptable limits.

18. The medium of claim 17, storing instructions, which when executed by one or more processors, would cause the processors to:

upon making the determination to delay acquisition of a measurement, wait through a delay interval; and after the end of the delay interval, repeat the steps of checking the hardware and making the determination to either acquire or delay acquisition of the measurement.

* * * * *